Dec. 25, 1956  A. G. BUHR  2,775,177
IMPLEMENT LIFT
Filed May 17, 1951
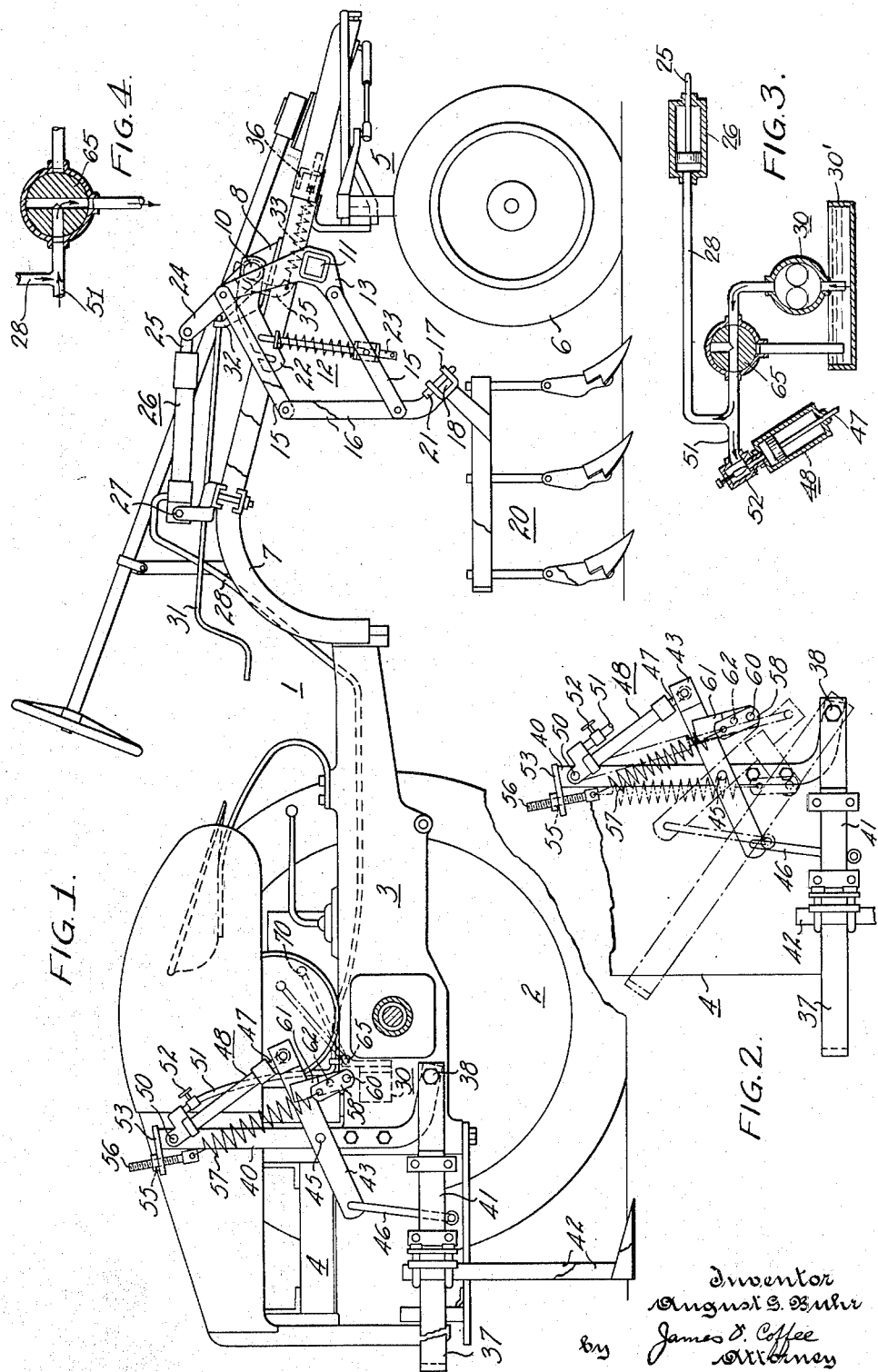

United States Patent Office 2,775,177
Patented Dec. 25, 1956

2,775,177

IMPLEMENT LIFT

August G. Buhr, La Crosse, Wis., assignor to Allis-Chalmers Manufacturing Company, Milwaukee, Wis.

Application May 17, 1951, Serial No. 226,879

6 Claims. (Cl. 97—46.37)

This invention relates generally to tractors and is more particularly directed to the improvement of lift mechanism deriving power from the tractor engine and operable to adjust the position of implements associated with the tractor.

In the cultivation of crops with tractor mounted implements it is customary to attach cultivating tools both fore and aft of the tractor in order to more completely work the soil between the plant rows. And in adopting such practice it is desirable to have an implement lifting means affording a delay in the raising and lowering of the rear mounted implements to provide for complete cultivation to the ends of the plant rows. Various means have been designed in conjunction with hydraulic lift apparatus to afford sequential raising and lowering of the front and rear mounted implements wherein the sequential operation on raising is automatically effected through use of a pressure differential valve and/or through a linkage arrangement providing greater resistance to raising one implement than the other and wherein the sequential lowering is effected through manually controlled valves arranged for operation in sequence. Such prior art systems require the constant attention of the operator while lowering the implements. The present invention contemplates hydraulic lift apparatus affording automatic sequential operation of the implements, mounted as described above, in both the raising and lowering thereof so that once the front implements have started their vertical movement the operator can devote his attention to controlling the tractor inasmuch as the rear implements will start their vertical movement at the proper time without the attention of the operator to the hydraulic controls.

Generally it is an object of the present invention to provide a hydraulically operated lift means for implements mounted at the front and rear of the tractor having parts constructed and arranged in a novel manner affording sequential vertical movement of the implements, in both the raising and lowering thereof, in response to a single movement of the control lever for the hydraulic lift.

A further object of this invention is to provide hydraulic implement lift means of the type utilizing single acting fluid motors and comprising new and improved structure affording automatic sequential raising and lowering of implements through coaction of motion transmitting elements and a flow reducing part disposed between the pump and one of the fluid actuated motors of the lift means.

It is also an object of the present invention to provide lift means, incorporating the features and advantages pointed out above, which is relatively inexpensive to manufacture, easy to install on the tractor and relatively trouble free during operation.

Accordingly, the present invention may be considered as comprising the various constructions and combinations hereinafter more particularly pointed out in the detailed description and appended claims, reference being had to the accompanying drawings illustrating but one embodiment of the invention, and in which:

Fig. 1 is a side view of an illustrative tractor and implement combination with parts omitted and broken away in order to more clearly show the structure embodying applicant's invention;

Fig. 2 is a side view of the rear implement lift means apart from the tractor, with the raised position thereof indicated in dot-dash lines;

Fig. 3 is a diagrammatic view of the hydraulic system incorporated in the tractor shown in Fig. 1; and Fig. 4 is a detailed view of a portion of the hydraulic system shown in Fig. 3.

Referring to the drawing, there is illustrated one embodiment of the present invention which will herein be described in detail. It is to be understood, however, that it is not intended to thereby limit the invention. Other modifications and constructions falling within the scope of the appended claims may be readily apparent to those skilled in the art.

The self-propelled vehicle 1 in the drawing is a commercial type tractor and will be described but briefly. Generally, the tractor comprises a rear traction means in the form of driving wheels 2, a rear axle and transmission housing structure 3, an engine 4 disposed in rearwardly extending relation to housing 3, a front axle structure 5 mounting a pair of dirigible front wheels 6, and a pair of upwardly arched bifurcated frame members 7 connecting the forward portion of housing 3 with front axle structure 5.

Tractor 1 mounts implements thereon at the front and rear in a known manner for soil working operations. With reference to the implement mounting structure at the forward end of the tractor, it is seen that arched frame members 7 carry a pair of transversely aligned brackets 8, preferably detachably secured in fixed relation to the tractor frame, and these brackets include aligned openings therethrough providing a support for opposite end portions of a rockshaft 10 journaled therein for relative rotation. Brackets 8 also provide a suitable support for a transverse bar 11 which is disposed in transverse underlying relation to frame members 7 and which extends laterally outwardly therefrom on either side of the tractor. Opposite end portions of transverse bar 11 mount parallel linkages 12 each comprising an arm 13 fixed with respect to bar 11 with end portions thereof projecting above and below the transverse bar, a pair of vertically spaced parallel links 15 pivotally connected to the projecting end portions of arm 13 and extending rearwardly therefrom, and comprising a vertically disposed rear member 16 pivotally interconnecting the rear end portions of parallel links 15 and having its lower end portion extending below and forwardly of the rear pivot axes of linkage 12. This lower end of member 16 presents a tool bar support 17 which includes an inclined U-shaped part affording means for detachably receiving a transverse tool bar 18 of an implement 20. Suitable aligned openings (not shown) are provided in support 17 to receive a wedge pin 21 or the like to secure tool bar 18 in fixed position with respect to support 17.

For effecting vertical movement of the front tool suspension mechanism, including linkages 12 and of the attached implement 20 there is provided a suitable lift means preferably in the form of a lift arm 22 fixed to one end of rockshaft 10 for rotation therewith, and a lift rod 23 pivotally connecting the free end portion of arm 22 with the lower link 15 of the underlying parallel linkage 12. A rock arm 24 is also fixedly secured to rockshaft 10 and is pivotally connected at its free end portion with the piston rod 25 of a single acting fluid motor or ram 26 mounted on the forward frame portion of the tractor for actuation of rockshaft 10. The cylinder portion of ram 26 is pivotally mounted at its rear end on a suitable bracket 27 carried by one of the frame members 7. Hose 28, connected to the rear portion of the ram, places the ram in communication with a source of fluid under pressure on the tractor including a pump 30, as will be explained more fully hereinbelow.

A rod 31, having its crank end suitably supported by bracket 27 and its forward screw threaded end carried by an internally threaded portion of an arm 32 rotatably supported on rockshaft 10, is disposed with its forward end in longitudinal alignment with rock arm 24 to provide means for adjustably limiting the rearward movement of the rock arm and thereby determine the maximum depth of penetration of the implement 20. A tension spring 33 is preferably utilized to assist the penetration of implement 20 and is disposed between an arm 35 non-rotatably fixed to rockshaft 10 and a forwardly disposed bracket 36 on the tractor frame.

The implement mounting structure at the rear of the tractor includes a rear tool suspension mechanism which comprises a yoke member 37 pivotally connected at the free ends thereof, as by bolt 38, to a pair of L-shaped strap members 40 fixed to opposite sides of the engine block and affording vertical swinging movement of yoke 37 about a transverse pivot axis. An L-shaped tool bar 41 is suitably attached to opposite sides of yoke 37 to afford a laterally extending support for cultivating implement 42 or the like disposed in adjacent rearward relation to driving wheels 2.

For raising and lowering yoke 37 and tool bars 41, as a unit, about the transverse pivot axis afforded by bolts 38 and, more particularly, for effecting a time lag or delay between the raising or lowering of the front mounted implement and the raising or lowering of the implement carried by yoke 37 at the rear of the tractor, there is provided a lift means now to be described.

The vertical portion of the L-shaped strap member 40 on the near side of the tractor is preferably extended upwardly alongside the engine and hood and a lift lever or arm 43 is pivotally connected thereto, as by pin 45, for swinging movement about an axis intermediate the ends of arm 43. The rearwardly disposed free end of arm 43 has a lift link or rod 46 pivotally interconnecting the arm with yoke 37 thereby providing for vertical swinging movement of the yoke in response to swinging movement of lift arm 43. The forwardly extending free end portion of lift arm 43 is pivotally connected to the piston rod 47 of a fluid motor or ram 48 which is pivotally supported at its opposite end by a pin 50, or the like, on the upper end of strap 40. Fluid is supplied to rear ram 48 by pump 30 through a hose or conduit 51, and an adjustable orifice or needle valve 52 of conventional construction is preferably placed in the line from the pump to the rear ram to afford an adjustable restriction to the flow of fluid therethrough for reasons to be explained hereinafter.

An adjustable spring biasing means is also provided for lift arm 43 at the rear of the tractor which comprises a supporting bracket 53 secured, as by welding, to the upper end of strap member 40 and presenting a free end portion having a screw threaded opening 55 therethrough, a threaded part 56 adjustably received in opening 55, a tension spring 57 pivotally connected at one end portion thereof to threaded part 56, a strap member 58 pivotally connected to the other end portion of spring 57 and having a stud or pin 60 fixed thereto, and an arm 61 fixed to the forwardly extending arm of lift lever 43 and providing a series of openings 62 therethrough to receive pin 60. It will be noted that adjustment of the tension of spring 57 may be made by adjusting part 56 relative to opening 55 and/or by changing the position of pin 60 to another of the openings 62 along arm 61.

It is believed sufficient to a complete understanding of the present invention to point out briefly that the hydraulic apparatus shown in Fig. 1, comprises a conventional type pump 30, receiving power for its operation from the tractor engine and having communication with a reservoir of suitable fluid on the tractor, including a two-way valve 65 actuable by operation of a hand lever 70 to control the flow of fluid between the pump and lift rams 26 and 48 on the tractor and between the lift rams and a point of discharge to reservoir 30. The particular construction of the valve and pump and the disposition of the latter with respect to the reservoir may be of any suitable type. For instance, as illustrated diagrammatically in Figs. 3 and 4, the valve 65 may be of the two-position type having a T-opening in a rotatable core which in its open position (Fig. 3) establishes connection between the pump 30 and the rams 26 and 48 through the conduits 28 and 51, respectively. In its closed position (Fig. 4) the valve 65 permits the return of fluid from the rams 26 and 48 to a reservoir 30'. Pump 30 may be of the continuously operating type which, when the valve 65 is in open position, delivers fluid to the rams. When the valve 65 is in its closed position, as shown in Fig. 4, fluid is emitted from the rams through valve 65 to the reservoir, and communication of the pump 30 with the rams is interrupted.

Having in mind the foregoing description of the implement lift means and referring to the drawing, a description will now be given of the operation of the illustrated embodiment of the present invention.

With the implements in their lowered or soil working position, as shown in Fig. 1 of the drawing, and with pump 30 in operation, a raising of the tools is achieved by movement of lever 70 to a position (indicated in dot-dash lines) wherein the two way pump control valve 65 is set as shown in Fig. 3 to permit the flow of pressure fluid through hoses 28 and 51 to the front and rear rams, respectively. The flow to the front ram being unimpeded there is a ready reaction of ram 26 to the pressure fluid to extend piston rod 25 with the result that the rock arm 24 is moved forwardly to effect a clockwise rotation of rockshaft 10. Lift arm 22 is then moved upwardly carrying linkages 12 and implement 20 with it. Tension spring 33 is disposed to oppose the aforementioned clockwise movement of rockshaft 10 in the illustrated embodiment in order to hold the implement in the ground and, also, to prevent too rapid a rise of the relatively lightweight tools. Should implement 20 comprise heavier tools the tension spring 33 might readily be eliminated.

Simultaneously with the flow of fluid to the front ram there is a flow through hose 51 toward the rear ram 48 as indicated in Fig. 3. However, in order to achieve a delay in the lifting of the rear tools, adjustable needle valve 52 has been placed in the line 51 and, consequently, rear ram 48 receives fluid at a slower rate than does the front ram 26. The amount of restriction is of course controlled by adjustment of the valve 52 to achieve the desired effect. In addition, spring 57 is selectively adjustable so that the weight of the yoke 37 and tool bar 41 and the tension of spring 57 provide a resistance to the extension of ram piston rod 47 which is greater than that offered by spring 33 and the weight of the front implement to the extension of ram piston rod 25. Consequently, the pressure fluid discharged by pump 30 will follow the easier course and act against the front ram first. When the front ram has been extended, the pressure fluid will then act against the rear ram to effect a clockwise movement of lift arm 43, thereby raising yoke 37 and implement 42 as shown in Fig. 2.

In raising the rear implement through movement of lift arm 43, it will be noted that spring 57 opposes the downward movement of piston rod 47 and consequent upward movement of the rear tool suspension mechanism from a tool lowered toward an intermediate tool raised position, as long as pin 60, forming the pivot axis for relative movement between arm 61 and strap 58, is forward (to the right as viewed in Fig. 1) of the pin 45 which provides the fulcrum for lift arm 43. However, once pin 60 moves to a position rearwardly of fulcrum 45 (indicated by the dot-dash lines in Fig. 2), spring 57 then assists clockwise movement of lift arm 43 by ram 48 and consequent movement of the rear tool suspension mechanism in tool raising direction beyond the mentioned intermediate tool raised position. Consequently, although the structure just described causes a delay in the initial lifting of the rear mounted tools, the rate of lift increases after there is no longer a need for slow upward movement of the implement. This is helpful, when turning at the end of the row, in readying the rear tools for being lowered into the next row.

With penetration of all tools having been achieved to the end of the row by virtue of the delayed lift just described and having made the turn into the next row to be cultivated, the operator now moves lever 70 to the dotted line position shown in Fig. 1 to open valve 65 as shown in Fig. 4 and thereby effect a return flow of fluid from the rams allowing the tools to be lowered. With valve 65 open for a return flow of the fluid to reservoir 30', spring 33 and the weight of linkages 12 and front implement 20 act to force piston rod 25 back into its cylinder, thereby forcing the fluid back through hose 28 to the reservoir 30' and allowing implement 20 to drop to its soil working position. However, the rear piston rod 47 does not move upwardly into its cylinder simultaneously with the front piston rod for several reasons. Spring 57 having moved to its over-center position (to the left of fulcrum pin 45 as shown in dot-dash lines in Fig. 2) in the final stages of the lifting of the rear implement, it is now acting to oppose counterclockwise movement of lift arm 43. Also, needle valve 52 is retarding the return flow of fluid through hose 51 and thus adds further opposition to the collapsing of ram 48 and the lowering of the rear implement. Furthermore, the flow of fluid from the front ram 26 to the reservoir 30' through valve 65 being under greater pressure, due to the front implement weight and the added action of spring 33, the fluid in hose 28 tends to block any simultaneous flow through valve 65 from hose 51. When the front ram has nearly assumed its collapsed position and the pressure in hose 28 has dropped, flow is then started through hose 51 from the rear ram and the weight of the rear implement 42 swings lift arm 43 in a counterclockwise direction. This movement of the implement is at first rather slow and then, when spring 57 has again moved past center with pin 60 forward of fulcrum pin 45 (as shown in Fig. 1), the rate of lowering is increased.

From the foregoing it is seen, therefore, that by a single movement of control lever 70 to one of its two positions a sequential vertical movement of the front and rear mounted implements is accomplished. Furthermore, it is seen that, through manipulation of spring 57 and needle valve 52, the time lag or interval between the vertical movement of the front and rear implements may be varied with broad limits. This feature has been proven to be quite valuable in that it affords ready adjustment of the hydraulic lift system for use with a wide variety of implements each of different weight. Furthermore, the above described means for achieving a delay in the lifting and lowering of rear mounted tools relative to those mounted at the front of the tractor is simple and inexpensive to construct and easy to adapt for use with tractors either having a source of hydraulic power or readily adaptable to provide such a source.

It is claimed and desired to secure by Letters Patent:

1. In combination with a tractor, a vertically adjustable front tool suspension mechanism and a vertically adjustable rear tool suspension mechanism mounted on said tractor for operation independently of each other, single acting biasing means operatively interposed between said tractor and said front tool suspension mechanism so as to resiliently oppose movement of the latter from a tool lowered toward a tool raised position, double acting biasing means operatively interposed between said tractor and said rear tool suspension mechanism and effective to resiliently oppose tool raising movement of said rear tool suspension mechanism from a tool lowered to an intermediate tool raised position, and to assist movement of said rear tool suspension mechanism in tool raising direction beyond said intermediate position, said double acting biasing means also being effective to resiliently oppose tool lowering movement of said rear tool suspension mechanism from a tool raised to an intermediate tool lowered position and to assist movement of said rear tool suspension mechanism in tool lowering direction beyond said intermediate position, front and rear single acting fluid motors operatively connected, respectively, with said front and rear tool suspension mechanisms so as to move said front and rear tool suspension mechanisms in tool raising direction upon admission of pressure fluid to said fluid motors, a source of pressure fluid, front and rear conduit means connecting said pressure source with said front and rear fluid motors, respectively, and affording a relatively low resistance to the flow of fluid to and from said front fluid motor, and a relatively high resistance to the flow of fluid to and from said rear fluid motor, and valve means operatively associated with said front and rear conduit means and selectively operable to either admit pressure from said source simultaneously to both of said front and rear conduit means, or to permit emission of pressure fluid simultaneously from said fluid motors through said conduit means.

2. The combination set forth in claim 1, wherein said rear conduit means include an adjustable orifice valve operatively interposed between said source of pressure fluid and said rear fluid motor.

3. In combination with a tractor, a vertically adjustable front tool suspension mechanism and a vertically adjustable rear tool suspension mechanism mounted on said tractor for operation independently of each other, a single acting biasing means operatively interposed between said tractor and said front tool suspension mechanism so as to resiliently oppose movement of the latter from a tool lowered toward a tool raised position, a lift lever having a pivot center on said tractor and presenting front and rear arms extending in generally opposite directions from said pivot center, a link connecting one of said arms in load transmitting relation with said rear tool suspension mechanism, and overcenter spring means operatively interposed between said tractor and the other of said arms and effective to resiliently oppose tool raising movement of said rear tool suspension mechanism from a tool lowered to an intermediate tool raised position and to assist movement of said rear tool mechanism in tool raising direction beyond said intermediate position, said overcenter spring means also being effective to resiliently oppose tool lowering movement of said rear tool suspension mechanism from a tool raised to an intermediate tool lowered position and to assist movement of said rear tool suspension mechanism in tool lowering direction beyond said intermediate position, front and rear single acting fluid motors operatively connected, respectively, with said front tool suspension mechanism and with said lift lever so as to move said front and rear tool suspension mechanisms in tool raising direction upon admission of pressure fluid to said fluid motors, a source of pressure fluid, front and rear conduit means connecting said pressure source with said front and rear fluid motors, respectively, and affording a relatively low resistance to the flow of fluid to and from said front fluid motor and a relatively high resistance to the flow of fluid to and from said rear fluid motor, and control means including a valve mechanism selectively operable to either admit pressure fluid from said source simultaneously to, or permit emission of pressure fluid simultaneously from, both of said fluid motors.

4. The combination set forth in claim 3, wherein said overcenter spring means comprise a coil spring having an upper anchor point on said tractor in upwardly spaced relation to the pivot center of said lift lever, and a lower anchor point located on said lift lever or movement therewith on an arc below said pivot center.

5. In combination with a tractor, a vertically adjustable front tool suspension mechanism and a vertically adjustable rear tool suspension mechanism mounted on said tractor for operation independently of each other, single acting fluid motors operatively connected, respectively, with said front and rear tool suspension mechanisms so as to move said front and rear tool suspension mechanisms in tool raising direction upon admission of pressure fluid to said fluid motors, a source of pressure fluid, and valve means selectively operable to either simultaneously connect both of said front and rear fluid motors to said source of pressure fluid for raising of both said front and rear tool suspension mechanisms, or to simultaneously connect both said fluid motors to a discharge for emission of pressure fluid from both said fluid motors for lowering of both said front and rear tool suspension mechanisms, and double acting biasing means operatively interposed between said tractor and said rear tool suspension mechanism and effective to delay both said raising and lowering of said rear tool suspension mechanism relative to raising and lowering, respectively, of said front tool suspension mechanism.

6. In combination with a tractor, a vertically adjustable front tool suspension mechanism and a vertically adjustable rear tool suspension mechanism mounted on said tractor for operation independently of each other, front and rear single acting fluid motors operatively connected, respectively, with said front and rear tool suspension mechanisms so as to move said front and rear tool suspension mechanisms in tool raising direction upon admission of pressure fluid to said fluid motors, a source of pressure fluid, and valve means selectively operable to simultaneously connect both of said front and rear fluid motors to said source of pressure fluid for raising of both said front and rear tool suspension mechanisms, or to simultaneously connect both said fluid motors to a discharge for emission of pressure fluid from both said fluid motors for the lowering of both said front and rear tool suspension mechanisms, a lift lever pivotally mounted on said tractor and connected in load transmitting relation with said rear tool suspension mechanism, and overcenter spring means operatively interposed between said tractor and said lift lever and effective to resiliently oppose and delay both said raising and lowering of said rear tool suspension mechanism relative to raising and lowering, respectively, of said front tool suspension mechanism.

References Cited in the file of this patent

UNITED STATES PATENTS

| | | |
|---|---|---|
| 587,067 | Roby | July 27, 1897 |
| 872,590 | Sturrock et al. | Dec. 3, 1907 |
| 2,213,401 | Lindgren et al. | Sept. 3, 1940 |
| 2,298,540 | Mott | Oct. 13, 1942 |
| 2,324,866 | Mott | July 20, 1943 |
| 2,328,064 | Doty | Aug. 31, 1943 |
| 2,332,739 | Mott | Oct. 26, 1943 |
| 2,568,528 | Welte | Sept. 18, 1951 |